US011900900B2

(12) United States Patent
Hiraku

(10) Patent No.: US 11,900,900 B2
(45) Date of Patent: Feb. 13, 2024

(54) MODIFIED WOOD, METHOD OF MANUFACTURING SAME, AND MUSICAL INSTRUMENT

(71) Applicant: Yamaha Corporation, Hamamatsu (JP)

(72) Inventor: Tatsuya Hiraku, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 227 days.

(21) Appl. No.: 16/853,196

(22) Filed: Apr. 20, 2020

(65) Prior Publication Data

US 2020/0342835 A1 Oct. 29, 2020

(30) Foreign Application Priority Data

Apr. 24, 2019 (JP) ................................ 2019-082766

(51) Int. Cl.

*G10D 3/22* (2020.01)
*B27K 3/34* (2006.01)
*G10D 1/08* (2006.01)

(52) U.S. Cl.

CPC ................ *G10D 3/22* (2020.02); *B27K 3/34* (2013.01); *G10D 1/08* (2013.01)

(58) Field of Classification Search

CPC .............. G10D 3/22; G10D 1/08; B27K 3/34
See application file for complete search history.

(56) References Cited

U.S. PATENT DOCUMENTS

2003/0084962 A1* 5/2003 Abe ......................... B27K 1/00 144/380
2017/0197388 A1* 7/2017 Yamazaki ................ G10C 3/06

FOREIGN PATENT DOCUMENTS

CN 1411964 A 4/2003
CN 107097307 A 8/2017
CN 109623987 A * 4/2019
JP 3520962 B2 4/2004

OTHER PUBLICATIONS

English translation of Chinese Office Action issued in Chinese Application No. 202010310593.7 dated Aug. 31, 2021 (nine (9) pages).

English Translation of Chinese-language Office Action issued in Chinese Application No. 202010310593.7 dated Feb. 2, 2021 (nine (9) pages).

Yano et al., "Changes in Acoustical Properties of Sitka Spruce due to Reaction with Formaldehyde", Journal of the Japan Wood Research Society, 1986, pp. 984-989, vol. 32, No. 12, with English abstract, six pages.

European Search Report issued in European Application No. 20170347.7 dated Oct. 7, 2020 (nine (9) pages).

Dapson, RW et al., "Brazilwood, Sappanwood, Brazilin and the Red Dye Brazilein: from Textile Dyeing and Folk Medicine to Biological Staining and Musical Instruments", Biotechnic and Histochemistry, Apr. 20, 2015, pp. 401-423, vol. 90, No. 6, XP055303839, (24 pages).

(Continued)

*Primary Examiner* — Jianchun Qin
(74) *Attorney, Agent, or Firm* — Crowell & Moring LLP

(57) ABSTRACT

A modified wood includes: a wood material; and a sappanwood extract component impregnated in the wood material.

15 Claims, 1 Drawing Sheet

(56) References Cited

OTHER PUBLICATIONS

Matsunaga, M. et al., "Vibrational Property Changes of Spruce Wood by Impregnation with Water-Soluble Extractives of Pernambuco (Guilandina echinata Spreng.) II: Structural Analysis of Extractive Components", Journal of Wood Science, Jun. 1, 2000, pp. 253-257, vol. 46, No. 3, XP036680707, (five (5) pages).
Matsunaga, M. et al., Vibrational Property Changes of Spruce Wood by Impregnation with Water-Soluble Extractives of Pernambuco (Guilandina echinata Spreng.), Journal of Wood Science, Dec. 1, 1999, pp. 470-474, vol. 45, No. 6, XP036680659, (five (5) pages).
Obataya. E. et al., "Influence of Moisture Content on the Vibrational Properties of Hematoxylin-Impregnated Wood", Journal of Wood Science, Aug. 1, 2001, pp. 317-321, vol. 47, No. 4, XP036418058, (five (5) pages).
Chinese-language Office Action issued in Chinese Application No. 202010310593.7 dated Feb. 8, 2022 with English translation (nine (9) pages).
European Office Action issued in European Application No. 20170347.7 dated Aug. 30, 2022 (seven (7) pages).
European Office Action issued in European Application No. 20 170 347.7 dated Oct. 9, 2023 (10 pages).
"Wood, Panel and Structural Timber Products-Mechanical Properties", The Egineering ToolBox, Aug. 30, 2023, pp. 1-10, XP093077499 (11 pages).
Otani, L.B. et al., "Elastic moduli characterization of wood and wood products using the Impluse Excitation Technique", ATCP Physical Engineering, Aug. 18, 2017, pp. 1-35, XP093077474 (35 pages).

* cited by examiner

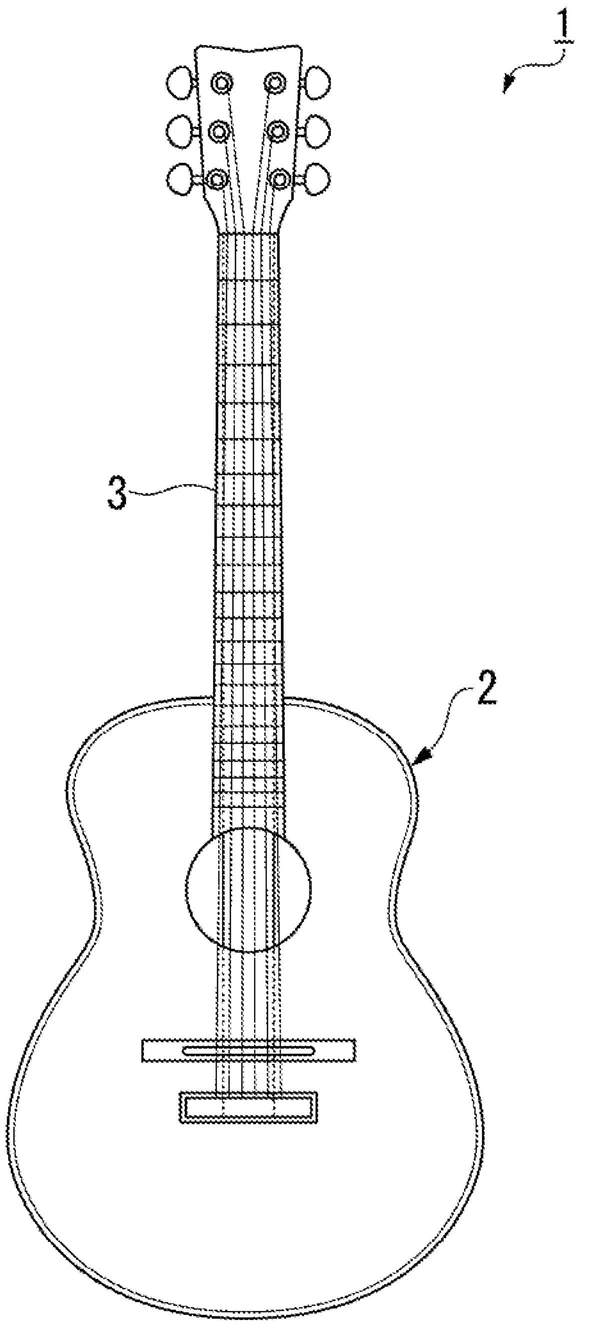
1
3
2

MODIFIED WOOD, METHOD OF MANUFACTURING SAME, AND MUSICAL INSTRUMENT

CROSS-REFERENCE TO RELATED APPLICATIONS

Priority is claimed on Japanese Patent Application No. 2019-082766, filed Apr. 24, 2019, the contents of which are incorporated herein by reference.

BACKGROUND OF THE INVENTION

Field of the Invention

Embodiments of the present invention relate to a modified wood, a method for manufacturing the modified wood, and a musical instrument.

Description of Related Art

Wood is used for stringed instruments, percussion instruments, wind instruments, and other musical instruments. As the wood used for musical instruments, it is preferable to use wood having a low internal loss (tan δ) so as to obtain good sound quality. However, wood with a low internal loss which is suitable as a material for musical instruments is rare. For this reason, it is required to modify the wood to reduce the internal loss.

Conventionally, as a method of reducing the internal loss of wood, there is a method of modifying wood using resorcinol and formaldehyde. However, since formaldehyde is used in this method, there is a drawback that the modified wood has a formaldehyde odor.

As a method of reducing the internal loss of wood without using formaldehyde, there is a method of modifying wood using hematoxylin. In one example, there is a method for modifying wood in which a solution containing hematoxylin and/or derivatives thereof is impregnated in or applied to the wood, after which drying is performed until a desired moisture content is obtained.

However, the method for modifying wood using a solution containing hematoxylin and/or derivatives thereof has the disadvantage of hematoxylin and/or derivatives thereof being expensive. Hematoxylin and/or derivatives thereof are produced by a method that involves extraction and purification from legumes. The purification performed to obtain hematoxylin and/or derivatives thereof is a laborious task, which is responsible for the high cost of hematoxylin and/or derivatives thereof.

SUMMARY OF THE INVENTION

The embodiments of the present invention have been made in view of the above circumstances. An object of the embodiments of the present invention is to provide a modified wood with low internal loss as a result of being impregnated with a modifying component that can be easily produced without purification, and a musical instrument using same.

Another object of the embodiments of the present invention is to provide a method for modifying a wood material to reduce the internal loss of the wood material using a modifying component that can be easily manufactured without purification.

A modified wood according to a first aspect of the present invention includes: a wood material; and a sappanwood extract component impregnated in the wood material.

A method according to a second aspect of the present invention is a method for manufacturing a modified wood that includes: an impregnation step of impregnating a wood material with a sappanwood extract component.

A musical instrument according to a third aspect of the present invention includes the above-mentioned.

A modified wood having an improved internal loss value according to a fourth aspect of the present invention includes: a wood material having a first internal loss value; and a sappanwood extract component that is impregnated into the wood material, such that after the wood material is impregnated the wood material attains a second internal loss value that is lower than the first internal loss value.

BRIEF DESCRIPTION OF THE DRAWINGS

FIG. 1 is a plan view showing an acoustic guitar as an example of a musical instrument according to an embodiment of the present invention.

DETAILED DESCRIPTION OF THE INVENTION

Hereinbelow, an embodiment to which the present invention is applied will be described in detail.

Modified Wood

The modified wood of the present embodiment has a wood material and a sappanwood extract component impregnated in the wood material.

In the present embodiment, the wood material being impregnated with the sappanwood extract component means that the wood material is in a state in which the sappanwood extract component has penetrated to a depth of at least 0.5 mm or more, preferably 2 mm or more from the surface of the wood.

The wood material used as the material of the modified wood preferably has an internal loss in the radial direction (R direction) of $12\times10^{-3}$ or more, and more preferably $15\times10^{-3}$ or more. A wood material having an internal loss of $12\times10^{-3}$ or more in the radial direction is preferable as a material for modified wood. This is because if such wood material is impregnated with a sappanwood extract component, the effect of reducing the internal loss is significant.

The wood material used as the material for the modified wood preferably has an internal loss in the radial direction of $25\times10^{-3}$ or less, and more preferably $23\times10^{-3}$ or less. A wood material having a radial internal loss of $25\times10^{-3}$ or less, by being impregnated with a sappanwood extract component, easily becomes a modified wood with a radial internal loss of $22\times10^{-3}$ or less, which is suitable as a material for a musical instrument and therefore preferable.

The wood material used as the material of the modified wood preferably has an internal loss in the fiber direction (L direction) of $4\times10^{-3}$ or more, and more preferably $5\times10^{-3}$ or more. A wood material having an internal loss of $4\times10^{-3}$ or more in the fiber direction is preferable as a material for modified wood. This is because if such wood material is impregnated with the sappanwood extract component, the effect of reducing the internal loss is significant.

The wood material used as the material of the modified wood preferably has an internal loss in the fiber direction of $12\times10^{-3}$ or less, and more preferably $10\times10^{-3}$ or less. A wood material having an internal loss in the fiber direction of $12\times10^{-3}$ or less, by being impregnated with a sappanwood extract component, easily becomes a modified wood having an internal loss in the fiber direction of $9\times10^{-3}$ or less, which is suitable as a material for a musical instrument and therefore preferable.

In the present embodiment, "internal loss (tan δ)" is a numerical value obtained by the method given below.

Using the free-free flexural vibration method (Yano, et al: Journal of The Japan Wood Research Society, 32:984-989 (1986)), the specific dynamic Young's modulus is calculated from the resonance frequency using the Euler-Bernoulli equation. Further, a logarithmic decay rate is obtained from the free decay curve, and the rate is divided by π and converted to tan δ to obtain a numerical value of the internal loss, which is the vibration decay rate.

Unless otherwise specified, the "internal loss (tan δ)" of a wood material or modified wood in the present embodiment is the measured value of the wood material or modified wood heated in an oven at a temperature of 105° C. until the mass is stabilized to obtain an absolutely dry condition and then left to stand until the mass is stabilized in an atmosphere with a temperature of 22° C. and a relative humidity of 60%.

The type of wood used as the material of the modified wood is not particularly limited, but is preferably one selected from maple, spruce, mahogany, beach, birch, and walnut. Since these woods are easily available, stable supply of modified wood obtained by impregnating these woods with a sappanwood extract component is possible. Moreover, since their internal loss is low, such woods are suitable as a material for high-performance musical instruments.

The type of wood used as the material for the modified wood is preferably one selected from maple, spruce, beach, birch, and walnut. In these woods, the effect of reducing internal loss by impregnation with a sappanwood extract component is remarkable. For this reason, impregnation with the sappanwood extract component results in a high-performance modified wood with an internal loss suitable as a material for a musical instrument, which is preferable.

The mass of the sappanwood extract component contained in the modified wood of the present embodiment is preferably 0.5 to 10% of the mass of the wood material (wood material before impregnation with the sappanwood extract component) in an absolutely dry condition, with 1 to 7% being more preferably. If the ratio of the mass of the sappanwood extract component in the modified wood to the mass of the wood material in the absolutely dry condition is 0.5% or more, a modified wood is obtained in which the effect of reducing the internal loss due to impregnation with the sappanwood extract component is remarkable. However, when the ratio of the mass of the sappanwood extract component in the modified wood to the mass of the wood material in an absolutely dry condition exceeds 10%, the effect of reducing the internal loss due to impregnation with the sappanwood extract component is saturated. For this reason, it is preferable that the mass of the sappanwood extract component in the modified wood be 10% or less of the mass of the wood material in an absolutely dry condition.

In the present embodiment, the "ratio of the mass of the sappanwood extract component in the modified wood to the mass of the wood material" is a numerical value obtained by measuring the mass of the wood in an absolutely dry condition (pre-treatment) and the mass of the modified wood in an absolutely dry condition (post-treatment) and performing a calculation using the following equation:

$$[\{(\text{post-treatment}-\text{pre-treatment})/\text{pre-treatment}\}\times100\ (\%)]$$

The modified wood of the present embodiment preferably has an air-dry density of 0.2 to 1.2 g/cm$^{-3}$, and more preferably 0.3 to 1.0 g/cm$^{-3}$. When the air-dry density of the modified wood is 0.2 g/cm$^{-3}$ or more, a musical instrument using the modified wood has sufficient rigidity as a musical instrument. If the air-dry density of the modified wood is 1.2 g/cm$^{-3}$ or less, a musical instrument using the wood will vibrate sufficiently when being played, leading to good sound volume and sound quality.

The elastic modulus in the fiber direction (L direction) of the modified wood of the present embodiment is preferably 7 to 20 GPa, and more preferably 8 to 18 GPa. The elastic modulus in the radial direction (R direction) of the modified wood is preferably 0.5 to 2.5 GPa, and more preferably 0.8 to 2 GPa. When the elastic modulus of the modified wood in the fiber direction and the elastic modulus in the radial direction are respectively within the above ranges, the modified wood becomes more suitable as a material for musical instruments. When the elastic modulus in the fiber direction of the modified wood is 7 GPa or more and the elastic modulus in the radial direction is 0.5 GPa or more, a musical instrument using the modified wood has sufficient rigidity as a musical instrument. Further, when the elastic modulus in the radial direction is 2.5 GPa or less, a difference between the elastic modulus in the radial direction and the elastic modulus in the fiber direction can be easily secured, resulting in a modified wood from which a musical instrument having a desired tone can be easily obtained.

Method for Manufacturing Modified Wood

A method for manufacturing the modified wood according to the present embodiment will be described.

The method for manufacturing the modified wood of the present embodiment includes an impregnation step of impregnating wood with a sappanwood extract component. It is preferable that the method for manufacturing modified wood of the present embodiment include prior to the impregnation step an extraction step of extracting the sappanwood extract component from sappanwood using water.

Extraction Step

In the extraction step, a sappanwood extract component is extracted from sappanwood using water.

The extractor used in the extraction step is not particularly limited.

The shape of the sappanwood used in the extraction step is not particularly limited, but for efficient extraction, it is preferable to use sappanwood in a chip state or a powder state, and particularly preferable to use a powder state.

The extraction step is not particularly limited, but for example, the following method is available.

In the extraction step, it is preferable to perform a first step in which sappanwood is used as a material to be extracted and a second step in which sappanwood separated from a sappanwood extract liquid is used as a material to be extracted.

The first step is a step of placing sappanwood into water and heating at a predetermined temperature for a predetermined time to obtain a sappanwood extract liquid, and then removing the sappanwood in the sappanwood extract liquid to obtain a sappanwood solution.

The mass of water used for the extraction in the first step is not particularly limited, but is preferably 10 to 20 times the mass of the sappanwood in order to extract the sappanwood extract component efficiently.

The extraction temperature in the first step is not particularly limited, but is preferably 95 to 98° C. in order to efficiently extract the sappanwood extract component.

The extraction time in the first step is, for example, 1 to 2 hours.

In the first step, the method for removing the sappanwood in the sappanwood extract liquid can be appropriately determined in accordance with the shape of the sappanwood used and is not particularly limited. For example, a method of filtering the sappanwood extract liquid using a wire mesh or cloth can be used.

The second step is a step in which the sappanwood separated from the sappanwood extract liquid is placed into water and heated at a predetermined temperature for a predetermined time to obtain a sappanwood extract liquid, and then the sappanwood in the sappanwood extract liquid is removed to obtain a sappanwood solution.

The mass of water used for the extraction in the second step is not particularly limited, but is preferably 10 to 20 times the mass of the sappanwood separated from the sappanwood extract liquid in order to extract the sappanwood extract component efficiently.

The extraction temperature and the extraction time in the second step are preferably within the same range as in the first step, in order to efficiently extract the sappanwood extract component.

In the second step, as the method of removing the sappanwood in the sappanwood extract liquid, for example the same method as in the first step can be used.

The second step may be performed a plurality of times as necessary. The number of times of extraction may be determined according to the shape of the sappanwood, the extraction temperature and the extraction time in the first step and the second step, and the like.

All the sappanwood solution obtained by performing the first step and the second step is collected to be used in the impregnation step described later.

In the present embodiment, in the extraction step, it is preferable to perform the extraction until the solid mass extracted from the sappanwood is 8 to 12% of the mass of the sappanwood prior to extraction, and more preferable to perform the extraction until the solid mass is 9 to 11%. By performing the extraction until the solid mass extracted from the sappanwood becomes 8% or more of the mass of the sappanwood prior to extraction, the extractable component contained in the sappanwood is sufficiently extracted, and a sappanwood solution is obtained with little variation in the composition of the sappanwood component and having stable quality. Further, in the case of extracting the sappanwood extract component from sappanwood using water, it is difficult to perform the extraction until the solid mass extracted from the sappanwood exceeds 12% of the mass of the sappanwood prior to extraction. For this reason, it is preferable that the solid mass extracted from the sappanwood be 12% or less of the mass of the sappanwood prior to extraction.

The ratio of the mass of the solid mass extracted from the sappanwood to the mass of the sappanwood prior to extraction varies depending on the shape of the sappanwood, the amount of water used for the extraction, the extraction temperature, the extraction time, and the number of extractions. Specifically, by reducing the shape (size) of sappanwood, increasing the amount of water used for extraction, increasing the extraction temperature, increasing the extraction time, and increasing the number of extractions, it is possible to increase the ratio of the solid mass extracted from the sappanwood to the mass of the sappanwood prior to extraction.

Accordingly, by extracting the sappanwood extract component from the sappanwood while varying the shape of sappanwood, the amount of water used for extraction, the extraction temperature, the extraction time, and the number of extractions so as to find in advance the ratio of the solid mass extracted from the sappanwood to the mass of the sappanwood prior to extraction under each condition, it is possible to find the condition under which the solid mass extracted from the sappanwood becomes the predetermined amount.

In the present embodiment, the solid mass extracted from the sappanwood is a numerical value obtained by taking a sample from the total amount of the sappanwood solution collected by performing the extraction process, evaporating the sample to dryness, and then calculating, using the obtained solid mass, the solid mass contained in the entire quantity of the sappanwood solution.

The sappanwood solution obtained by performing the extraction step (the solution obtained by collecting all the sappanwood solution obtained by performing the first step and the second step) may be concentrated or diluted as required to adjust the concentration of the sappanwood extract component in the sappanwood solution.

Methods of concentrating the sappanwood solution include, for example, a method of heating the sappanwood solution to evaporate water contained in the sappanwood solution. In this case, the sappanwood solution may be heated under reduced pressure to reduce the time required for concentration of the sappanwood solution.

Methods of diluting the sappanwood solution include, for example, a method of adding water to the sappanwood solution.

Impregnation Step

In the impregnation step, the wood is impregnated with the sappanwood extract component. The impregnation step is preferably a step of immersing the wood in a sappanwood solution.

The impregnation step is preferably a step of immersing the wood material in a sappanwood solution containing 0.1 to 5.0% by mass of the sappanwood extract component, and more preferably a step of immersing the wood in a sappanwood solution containing 0.5 to 4.0% by mass of the sappanwood extract component. When the amount of the sappanwood extract component contained in the sappanwood solution is 0.1% by mass or more, it is easy to obtain modified wood in which the mass of the sappanwood extract component is 0.5% or more of the mass of the wood material, which is preferred. In addition, it is preferred that the sappanwood extract component contained in the sappanwood solution be 5.0% by mass or less, since it is easy to obtain modified wood in which the mass of the sappanwood extract component is 10% or less of the mass of the wood material.

The mass of the sappanwood extract component in the modified wood can be adjusted by controlling the concentration of the sappanwood extract component in the sappanwood solution in which the wood material is immersed in accordance with the type and thickness of the wood material used as the material and, as needed, performing at least once one or a plurality of methods selected from for example the following methods (1) to (5) for promoting the impregnation of the wood material with the sappanwood extract component.

(1) A method of transmitting ultrasonic waves to the sappanwood solution in which the wood material is immersed; (2) a method of making a hole in the wood material and then immersing in the sappanwood solution; (3) a method of subjecting the wood material to reduced pressure while immersed in the sappanwood solution; (4) a method of subjecting the wood material to increased pressure while being immersed in the sappanwood solution; and (5) a method of heating the sappanwood solution in which the wood material is immersed.

The above-mentioned method (3) of subjecting the wood material to reduced pressure while being immersed in the sappanwood solution includes, for example, a method in which the wood material immersed in the sappanwood solution is subjected to pressure of 20 to 50 hPa in a closed container for 30 minutes to 1 hour. By subjecting the wood material to reduced pressure while being immersed in the sappanwood solution, the air in the wood material is evacuated, and the impregnation of the wood material with the sappanwood extract component is promoted. After performing the above method (3), the wood material which has subsequently been returned to normal pressure may continue to be immersed in the sappanwood solution.

The above-mentioned method (4) of subjecting the wood material to increased pressure while being immersed in the sappanwood solution includes, for example, a method in which wood material immersed in the sappanwood solution is subjected to pressure of 2 to 10 MPa in a closed container for 30 minutes to 2 hours. The method (4) of subjecting the wood material to increased pressure while being immersed in the sappanwood solution may be performed on the wood material after the method (3) is performed.

The above-mentioned method (5) of heating the sappanwood solution in which the wood is immersed includes, for example, a method of heating the sappanwood solution to 50° C. to 90° C.

When the wood material used as the material is a wood veneer having a thickness of 1 mm or less, it is possible to sufficiently impregnate the wood material with the sappanwood extract component simply by controlling the concentration of the sappanwood extract component in the sappanwood solution in which the wood material is immersed.

When the wood material used as the material is a wood veneer having a thickness of 1 mm to several mm, it is preferable to use the above-mentioned method (3) of subjecting the wood material to decreased pressure while being immersed in the sappanwood solution.

When the wood material used as the material is a high specific gravity material veneer with a thickness exceeding several millimeters, it is preferable to use the above-mentioned method (4) of subjecting the wood material to increased pressure while being immersed in the sappanwood solution after performing the above-mentioned method (3).

In the impregnation step, it is preferable to perform a step of drying the wood material after the step of immersing the wood material in the sappanwood solution.

The step of drying the wood material may be, for example, a natural drying step in which the wood material is allowed to stand for about one week to several months in a normal temperature and normal pressure environment or may be an artificial drying step that adjusts the humidity to a desired moisture content in an environment where the temperature and humidity are controlled. Additionally, the artificial drying step may be performed after the natural drying step.

The modified wood of the present embodiment has a wood material and a sappanwood extract component impregnated in the wood material. The sappanwood extract component is obtained simply by extraction from sappanwood using water, and so can be easily manufactured without purification.

The sappanwood extract component is a modifying component that, by being impregnated in a wood material, reduces the internal loss of the wood material. Therefore, the modified wood of the present embodiment has low internal loss.

In addition, the method for manufacturing the modified wood of the present embodiment includes an impregnation step of impregnating a wood material with a sappanwood extract component. Therefore, according to the method for manufacturing the modified wood of the present embodiment, the internal loss of a wood material can be reduced using a modifying component that can be easily manufactured without purification. Further, with the method for manufacturing the modified wood of the present embodiment, it is possible to reduce the internal loss of a wood material without the use of a chemical substance such as formaldehyde, which is preferable.

In the method for manufacturing the modified wood of the present embodiment, the rate of change of the air-dry density [{(post-treatment−pre-treatment)/pre-treatment}×100(%)] between the wood material used as the material and the modified wood obtained after the impregnation step is small. The rate of change of the air-dry density varies depending on the type of wood material used as the material, the mass ratio of the sappanwood extract component, and the like. The rate of change of the air-dry density is preferably in the range of −5% to 5%, and more preferably in the range of −4% to 4%. When the rate of change of the air-dry density is −5% to 5%, by performing the impregnation step on a wood material having an air-dry density suitable for musical instruments, modified wood with a low internal loss is obtained without affecting the air dry density.

In the method for manufacturing the modified wood of the present embodiment, the rate of change of the elastic modulus [{(post-treatment−pre-treatment)/pre-treatment}×100 (%)] in the fiber direction (L direction) and the radial direction (R direction) between the wood material used as the material and the modified wood obtained after the impregnation step is small. The rate of change in the elastic modulus in the fiber direction and in the radial direction differs depending on the type of wood material used as the material, the mass ratio of the sappanwood extract component, and the like. The rate of change of the elastic modulus in the fiber direction is preferably from −7 to 2%. The rate of change of the elastic modulus in the radial direction is preferably −6 to 20%. When the rates of change of the elastic modulus in the fiber direction and the radial direction are within the above ranges, by performing the impregnation step on a wood material having an elastic modulus suitable as a material for musical instruments, a modified wood is obtained having an elastic modulus suitable as a material for musical instruments and having a low internal loss.

Musical Instrument

Next, the musical instrument of the present embodiment will be described in detail with reference to examples.

FIG. 1 is a plan view showing an acoustic guitar as an example of the musical instrument according to the present embodiment.

In the example of FIG. 1, an acoustic guitar 1 includes a body 2 and a fingerboard 3.

The acoustic guitar 1 of the present embodiment uses the above-described modified wood of the present embodiment as the material of the body 2 and/or the fingerboard 3. The modified wood of the present embodiment used as the material of the body 2 and/or the fingerboard 3 has low internal loss. For this reason, the acoustic guitar 1 of the present embodiment has good sound quality.

Other Examples

The musical instrument of the present embodiment is not limited to the above example.

In the present embodiment, an acoustic guitar has been described as an example of the musical instrument, but the musical instrument may be any one employing the modified wood of the present embodiment, and is not limited to an acoustic guitar. In addition to an acoustic guitar, stringed instruments such as violins, percussion instruments such as drums, keyboard instruments such as pianos, wind instruments and the like are examples of the musical instrument of the present embodiment.

Working Examples

Hereinbelow, the present embodiment will be described more specifically with reference to Working Examples and Comparative Examples. It should be noted that the present embodiment is not limited only to the following Working Examples.

Working Example 1

A sappanwood extract component was extracted from powdered sappanwood using hot water (extraction step). The solid mass extracted from the sappanwood by performing the extraction step was 10% of the mass of the sappanwood.

Next, water was added to the sappanwood solution obtained by performing the extraction step to obtain a sappanwood solution containing 0.7% by mass of the sappanwood extract component.

Wood Material

Two samples (sample Nos. 1 and 2) of maple having a length in the L direction (fiber direction) of 180 mm, a length in the R direction (radial direction) of 20 mm, and a thickness of 4.5 mm (hereinafter referred to as maple (L)) were prepared.

Next, each sample of maple (L) was heated in an oven at a temperature of 105° C. until the mass was stabilized and put in an absolutely dry state, and then the mass was measured (pre-treatment in Table 1). Each maple (L) sample brought to an absolutely dry state was then subjected to a humidity control treatment in an atmosphere with a temperature of 22° C. and a relative humidity of 60% until the mass stabilized. Subsequently the air-dry density and the elastic modulus were measured by the methods described below. The internal loss (tan δ) was measured by the method described above (pre-treatment in Table 1). Table 1 shows the results.

Method of Measuring Air-Dry Density

The dimensions of each maple (L) sample were measured using calipers, and the volume of each maple (L) sample was calculated. The mass of each maple (L) sample was divided by the calculated volume of each maple (L) sample to obtain the air-dry density thereof.

Method of Measuring Elastic Modulus

Using the free-free flexural vibration method (Yano et al: Journal of The Japan Wood Research Society, 32:984-989 (1986)), the specific dynamic Young's modulus was obtained from the resonance frequency using the Euler-Bernoulli equation, and the obtained value was used as the elastic modulus.

Impregnation Step

Next, each maple (L) sample of which the internal loss was measured was placed in a closed container in a state of being immersed in the sappanwood solution containing 0.7% by mass of the sappanwood extract component, and then subjected to a reduced pressure of 30 hPa for a certain time. Each maple (L) sample was subsequently returned to a normal-temperature and normal-pressure environment, with the immersion in the sappanwood solution for a certain period of time in succession.

Thereafter, each maple (L) sample was removed from of the sappanwood solution and naturally dried by being left to stand in a normal-temperature and normal-pressure environment, whereby two pieces of the modified wood of Working Example 1 were obtained.

The cross section of the obtained modified wood of Working Example 1 was observed with a microscope. As a result, it was confirmed that the sappanwood extract component was impregnated into the wood surface at an average depth of 1 mm or more.

Calculation of Mass Ratio of Sappanwood Extract Component

Each of the modified wood pieces thus obtained was heated in an oven at 105° C. until the mass was stabilized and put in an absolutely dry state, and then the mass of each was measured (post-treatment in Table 1), and the rate of change from before the treatment [{(post-treatment−pre-treatment)/pre-treatment}×100(%)] and the average value were determined and defined as the ratio of the mass of the sappanwood extract component in the modified wood to the mass of the wood material.

Further, each modified wood in an absolutely dry condition was subjected to a humidity control treatment in an atmosphere with a temperature of 22° C. and a relative humidity of 60% until the mass stabilized. Subsequently the air-dry density, elastic modulus, and internal loss were measured by the methods described above, and the rate of change from before the treatment [{(post-treatment−pre-treatment)/pre-treatment}×100(%)] and the average value thereof were determined (post-treatment in Table 1). Table 1 shows the results.

TABLE 1

| | SAPPANWOOD | | | RATIO OF MASS OF SAPPANWOOD | ATMOSPHERE WITH TEMPERATURE 22° C., RELATIVE HUMIDITY 60% AIR-DRY DENSITY (g/cm³) | | |
|---|---|---|---|---|---|---|---|
| | WOOD TYPE | SOLUTION DENSITY (MASS %) | SAMPLE NO. | EXTRACT COMPONENT (%) | PRE-TREATMENT | POST-TREATMENT | RATE OF CHANGE (%) |
| WORKING EXAMPLE 1 | MAPLE (L) | 0.7% | 1 | 1.55 | 0.65 | 0.65 | −0.73 |
| | | | 2 | 1.60 | 0.65 | 0.64 | −1.86 |
| | | | AVERAGE VALUE | 1.57 | | | −1.30 |
| WORKING EXAMPLE 2 | MAPLE (R) | 0.7% | 1 | 2.57 | 0.63 | 0.63 | −0.70 |
| | | | 2 | 2.52 | 0.64 | 0.63 | −1.42 |
| | | | AVERAGE VALUE | 2.54 | | | −1.06 |
| WORKING EXAMPLE 3 | MAPLE (L) | 1.8% | 1 | 5.07 | 0.66 | 0.65 | −0.82 |
| | | | 2 | 5.23 | 0.63 | 0.63 | −0.22 |
| | | | AVERAGE VALUE | 5.15 | | | −0.52 |
| WORKING EXAMPLE 4 | MAPLE (R) | 1.8% | 1 | 6.30 | 0.64 | 0.64 | −0.12 |
| | | | 2 | 6.26 | 0.64 | 0.64 | −0.56 |
| | | | AVERAGE VALUE | 6.28 | | | −0.34 |
| WORKING EXAMPLE 5 | MAPLE (L) | 5.1% | 1 | 7.10 | 0.69 | 0.69 | 0.83 |
| | | | 2 | 7.65 | 0.67 | 0.67 | 0.83 |
| | | | AVERAGE VALUE | 7.38 | | | 0.83 |
| WORKING EXAMPLE 6 | MAPLE (R) | 5.1% | 1 | 9.97 | 0.63 | 0.64 | 1.72 |
| | | | 2 | 9.79 | 0.63 | 0.65 | 1.94 |
| | | | AVERAGE VALUE | 9.88 | | | 1.83 |

| | ATMOSPHERE WITH TEMPERATURE 22° C., RELATIVE HUMIDITY 60% | | | | | |
|---|---|---|---|---|---|---|
| | ELASTIC MODULUS E' (Gpa) | | | TAN δ (×10⁻³) | | |
| | PRE-TREATMENT | POST-TREATMENT | RATE OF CHANGE (%) | PRE-TREATMENT | POST-TREATMENT | RATE OF CHANGE (%) |
| WORKING EXAMPLE 1 | 9.08 | 9.11 | 0.28 | 9.38 | 8.19 | −12.71 |
| | 9.82 | 9.49 | −3.38 | 9.20 | 8.05 | −12.44 |
| | | | −1.55 | | | −12.57 |
| WORKING EXAMPLE 2 | 1.67 | 1.75 | 4.61 | 17.75 | 14.42 | −18.72 |
| | 1.66 | 1.69 | 1.79 | 17.56 | 14.58 | −16.96 |
| | | | 3.20 | | | −17.84 |
| WORKING EXAMPLE 3 | 10.01 | 9.81 | −1.95 | 8.99 | 6.39 | −28.87 |
| | 10.14 | 10.11 | −0.31 | 8.65 | 6.03 | −30.25 |
| | | | −1.13 | | | −29.56 |
| WORKING EXAMPLE 4 | 1.77 | 1.93 | 9.29 | 17.06 | 10.95 | −35.79 |
| | 1.74 | 1.89 | 8.74 | 17.47 | 11.41 | −34.70 |
| | | | 9.01 | | | −35.24 |
| WORKING EXAMPLE 5 | 10.57 | 10.59 | 0.26 | 9.70 | 6.38 | −34.20 |
| | 10.09 | 10.15 | 0.66 | 9.71 | 6.04 | −37.84 |
| | | | 0.46 | | | −36.02 |
| WORKING EXAMPLE 6 | 1.74 | 2.04 | 17.13 | 18.83 | 9.56 | −49.23 |
| | 1.72 | 2.06 | 19.85 | 18.19 | 10.46 | −42.48 |
| | | | 18.49 | | | −45.86 |

Working Example 2

Modified wood of Working Example 2 was obtained in the same manner as in Working Example 1, except for using two samples (sample Nos. 1 and 2) of maple having a length in the L direction (fiber direction) of 20 mm, a length in the R direction (radial direction) of 180 mm, and a thickness of 4.5 mm (hereinafter referred to as maple (R)) as the wood material.

Working Example 3

A sappanwood solution obtained by performing the extraction step in the same manner as in Working Example 1 was heated to evaporate the water contained in the sappanwood solution, whereby a sappanwood solution containing 1.8% by mass of the sappanwood extract component was obtained. The modified wood of Working Example 3 was obtained in the same manner as in Working Example 1 except that the sappanwood solution containing 1.8% by mass of the sappanwood extract component was used.

Working Example 4

Modified wood of Working Example 4 was obtained in the same manner as in Working Example 3, except for using maple (R) as the wood material.

Working Example 5

A sappanwood solution obtained by performing the extraction step in the same manner as in Working Example 1 was heated to evaporate the water contained in the sappanwood solution, whereby a sappanwood solution containing 5.1% by mass of the sappanwood extract component was obtained. The modified wood of Working Example 5 was obtained in the same manner as in Working Example 1 except that the sappanwood solution containing 5.1% by mass of the sappanwood extract component was used.

Working Example 6

Modified wood of Working Example 6 was obtained in the same manner as in Working Example 5, except for using maple (R) as the wood material.

For each piece of maple (L) or (R) used in Working Examples 2 to 6, the mass, air-dry density, elastic modulus, and internal loss were measured in the same manner as in Working Example 1 (pre-treatment in Table 1).

The cross section of each of the modified woods of Working Examples 2 to 6 was observed in the same manner as in Working Example 1. As a result, it was confirmed that the sappanwood extract component was impregnated to an average depth of 1 mm or more from the surface of the wood material in all the modified woods.

Further, in the same manner as in Working Example 1, the mass of each modified wood of Working Examples 2 to 6 was measured in an absolutely dry condition (post-treatment in Table 1), the rate of change from before the treatment and the average value thereof were obtained, and the ratio of the mass of the sappanwood extract component was calculated.

Further, each of the modified woods of Working Examples 2 to 6 in an absolutely dry condition was subjected to a humidity control treatment in an atmosphere with a temperature of 22° C. and a relative humidity of 60% until the mass became stable. Similarly to Working Example 1, the air-dry density, elastic modulus, and internal loss of each were measured, and then the rate of change from before the treatment and the average values thereof were determined (post-treatment in Table 1). Table 1 shows the results.

As shown in Table 1, it was confirmed that a reduction in the internal loss of each maple (L) and maple (R) sample was achieved by immersion of the samples in the sappanwood extract liquid to impregnate the sappanwood extract component therein.

When the maple (R) is used as the wood material, the absolute value of the rate of change of the internal loss is larger than when the maple (L) is used, whereby it is understood that the effect of reducing the internal loss by impregnation with the sappanwood extract component is greater when the maple (R) is used.

From the results of Working Examples 1 to 6, it was found that the reduction in the internal loss increased as sappanwood extract liquid containing more of the sappanwood extract component was used.

Working Example 7

Each modified wood of Working Example 1 was subjected to a humidity control treatment in an atmosphere with a temperature of 35° C. and a relative humidity of 95% until the mass became stable. The air-dry density, elastic modulus, and internal loss of each were measured by the above-described methods, and the average values thereof were determined (post-processing in Table 2). Table 2 shows the results.

Working Example 8

Each modified wood of Working Example 2 was subjected to a humidity control treatment in an atmosphere with a temperature of 35° C. and a relative humidity of 95% until the mass became stable. The air-dry density, elastic modulus, and internal loss of each were measured by the above-described methods, and the average values thereof were determined (post-processing in Table 2). Table 2 shows the results.

Working Example 9

Each modified wood of Working Example 3 was subjected to a humidity control treatment in an atmosphere with a temperature of 35° C. and a relative humidity of 95% until the mass became stable. The air-dry density, elastic modulus, and internal loss of each were measured by the above-described methods, and the average values thereof were determined (post-processing in Table 2). Table 2 shows the results.

Working Example 10

Each modified wood of Working Example 4 was subjected to a humidity control treatment in an atmosphere with a temperature of 35° C. and a relative humidity of 95% until the mass became stable. The air-dry density, elastic modulus, and internal loss of each were measured by the above-described methods, and the average values thereof were determined (post-processing in Table 2). Table 2 shows the results.

Working Example 11

Each modified wood of Working Example 5 was subjected to a humidity control treatment in an atmosphere with a temperature of 35° C. and a relative humidity of 95% until the mass became stable. The air-dry density, elastic modulus, and internal loss of each were measured by the above-described methods, and the average values thereof were determined (post-processing in Table 2). Table 2 shows the results.

TABLE 2

| | WOOD TYPE | SAPPANWOOD SOLUTION DENSITY (MASS %) | SAMPLE NO. | ATMOSPHERE WITH TEMPERATURE 35° C., RELATIVE HUMIDITY 95% AIR-DRY DENSITY ($g/cm^3$) PRE-TREATMENT |
|---|---|---|---|---|
| WORKING EXAMPLE 7 | MAPLE (L) | 0.7% | 1 | |
| | | | 2 | |
| | | | AVERAGE | |

TABLE 2-continued

| | | | | |
|---|---|---|---|---|
| WORKING EXAMPLE 8 | MAPLE (R) | 0.7% | 1 | |
| | | | 2 | |
| | | | AVERAGE | |
| WORKING EXAMPLE 9 | MAPLE (L) | 1.8% | 1 | |
| | | | 2 | |
| | | | AVERAGE | |
| WORKING EXAMPLE 10 | MAPLE (R) | 1.8% | 1 | |
| | | | 2 | |
| | | | AVERAGE | |
| WORKING EXAMPLE 11 | MAPLE (L) | 5.1% | 1 | |
| | | | 2 | |
| | | | AVERAGE | |
| COMPARATIVE EXAMPLE 1 | MAPLE (L) | — | 1 | 0.71 |
| | | | 2 | 0.70 |
| | | | AVERAGE | 0.71 |
| COMPARATIVE EXAMPLE 2 | MAPLE (R) | — | 1 | 0.66 |
| | | | 2 | 0.66 |
| | | | AVERAGE | 0.66 |

| | ATMOSPHERE WITH TEMPERATURE 35° C., RELATIVE HUMIDITY 95% | | | | |
|---|---|---|---|---|---|
| | AIR-DRY DENSITY ($g/cm^3$) | ELASTIC MODULUS E' (Gpa) | | TAN δ ($\times 10^{-3}$) | |
| | POST-TREATMENT | PRE-TREATMENT | POST-TREATMENT | PRE-TREATMENT | POST-TREATMENT |
| WORKING | 0.67 | | 7.13 | | 17.31 |
| EXAMPLE | 0.67 | | 7.72 | | 16.25 |
| 7 | 0.67 | | 7.42 | | 16.78 |
| WORKING | 0.65 | | 1.19 | | 40.60 |
| EXAMPLE | 0.66 | | 1.15 | | 39.35 |
| 8 | 0.66 | | 1.17 | | 39.98 |
| WORKING | 0.68 | | 8.43 | | 14.79 |
| EXAMPLE | 0.65 | | 8.52 | | 15.84 |
| 9 | 0.67 | | 8.47 | | 15.31 |
| WORKING | 0.66 | | 1.48 | | 37.10 |
| EXAMPLE | 0.66 | | 1.40 | | 35.81 |
| 10 | 0.66 | | 1.44 | | 36.45 |
| WORKING | 0.72 | | 8.44 | | 15.78 |
| EXAMPLE | 0.71 | | 8.61 | | 15.84 |
| 11 | 0.71 | | 8.53 | | 15.81 |
| COMPARATIVE | | 9.47 | | 16.26 | |
| EXAMPLE | | 9.62 | | 17.95 | |
| 1 | | 9.55 | | 17.11 | |
| COMPARATIVE | | 1.18 | | 40.23 | |
| EXAMPLE | | 1.12 | | 42.70 | |
| 2 | | 1.15 | | 41.47 | |

Comparative Example 1

Two maple (L) samples (sample Nos. 1 and 2) were prepared and subjected to humidity control in an atmosphere with a temperature of 35° C. and a relative humidity of 95% until the mass became stable. The dry density, elastic modulus, and internal loss were measured for each sample in the same manner as Working Example 1, and the average values thereof determined (pre-treatment in Table 2). Table 2 shows the results.

Comparative Example 2

Two maple (R) samples (sample Nos. 1 and 2) were prepared and subjected to humidity control in an atmosphere with a temperature of 35° C. and a relative humidity of 95% until the mass became stable. The dry density, elastic modulus, and internal loss were measured for each sample in the same manner as Working Example 1, and the average values thereof determined (pre-treatment in Table 2). Table 2 shows the results.

As shown in Table 2, it was confirmed that a reduction in the internal loss of each maple (L) and maple (R) sample was achieved in the atmosphere with a temperature of 35° C. and a relative humidity of 95% by immersion of the samples in the sappanwood extract liquid to impregnate the sappanwood extract component therein.

Working Example 21

The modified wood of Working Example 21 was obtained in the same manner as Working Example 3, except for using two pieces of spruce having a length in the L direction (fiber direction) of 180 mm, a length in the R direction (radial direction) of 20 mm, and a thickness of 4.5 mm (hereinafter referred to as spruce (L)) as the wood.

Working Example 22

The modified wood of Working Example 22 was obtained in the same manner as Working Example 4, except for using two pieces of spruce having a length in the L direction (fiber direction) of 20 mm, a length in the R direction (radial direction) of 180 mm, and a thickness of 4.5 mm (hereinafter referred to as spruce (R)) as the wood.

Working Example 23

The modified wood of Working Example 23 was obtained in the same manner as Working Example 3, except for using two pieces of birch having a length in the L direction (fiber direction) of 180 mm, a length in the R direction (radial direction) of 20 mm, and a thickness of 4.5 mm (hereinafter referred to as birch (L)) as the wood.

Working Example 24

The modified wood of Working Example 24 was obtained in the same manner as Working Example 4, except for using two pieces of birch having a length in the L direction (fiber direction) of 20 mm, a length in the R direction (radial direction) of 180 mm, and a thickness of 4.5 mm (hereinafter referred to as birch (R)) as the wood.

Working Example 25

The modified wood of Working Example 25 was obtained in the same manner as Working Example 3, except for using two pieces of beech having a length in the L direction (fiber direction) of 180 mm, a length in the R direction (radial direction) of 20 mm, and a thickness of 4.5 mm (hereinafter referred to as beech (L)) as the wood.

Working Example 26

The modified wood of Working Example 26 was obtained in the same manner as Working Example 4, except for using two pieces of beech having a length in the L direction (fiber direction) of 20 mm, a length in the R direction (radial direction) of 180 mm, and a thickness of 4.5 mm (hereinafter referred to as beech (R)) as the wood.

Working Example 27

The modified wood of Working Example 27 was obtained in the same manner as Working Example 3, except for using two pieces of mahogany having a length in the L direction (fiber direction) of 180 mm, a length in the R direction (radial direction) of 20 mm, and a thickness of 4.5 mm (hereinafter referred to as mahogany (L)) as the wood.

Working Example 28

The modified wood of Working Example 28 was obtained in the same manner as Working Example 4, except for using two pieces of mahogany having a length in the L direction (fiber direction) of 20 mm, a length in the R direction (radial direction) of 180 mm, and a thickness of 4.5 mm (hereinafter referred to as mahogany (R)) as the wood.

Working Example 29

The modified wood of Working Example 29 was obtained in the same manner as Working Example 3, except for using two pieces of walnut having a length in the L direction (fiber direction) of 180 mm, a length in the R direction (radial direction) of 20 mm, and a thickness of 4.5 mm (hereinafter referred to as walnut (L)) as the wood.

Working Example 30

The modified wood of Working Example 30 was obtained in the same manner as Working Example 4, except for using two pieces of walnut having a length in the L direction (fiber direction) of 20 mm, a length in the R direction (radial direction) of 180 mm, and a thickness of 4.5 mm (hereinafter referred to as walnut (R)) as the wood.

For each wood material used in Working Examples 21 to 30, the mass, air-dry density, elastic modulus, and internal loss were measured in the same manner as in Working Example 1 (pre-treatment in Table 3 and Table 4).

The cross section of each of the modified woods of Working Examples 21 to 30 was observed in the same manner as in Working Example 1. As a result, it was confirmed that the sappanwood extract component was impregnated to an average depth of 1 mm or more from the surface of the wood in all the modified woods.

Further, in the same manner as in Working Example 1, the mass of each modified wood of Working Examples 21 to 30 was measured in an absolutely dry condition (post-treatment in Table 3 and Table 4), the rate of change from before the treatment and the average value thereof were obtained, and the ratio of the mass of the sappanwood extract component was calculated.

Further, each of the modified woods of Working Examples 21 to 30 in an absolutely dry condition was subjected to a humidity control treatment in an atmosphere with a temperature of 22° C. and a relative humidity of 60% until the mass became stable. Similarly to Working Example 1, the air-dry density, elastic modulus, and internal loss of each were measured, and then the rate of change from before the treatment and the average values thereof were determined (post-treatment in Table 3 and Table 4). Table 3 and Table 4 show the results.

Table 3 also shows the results of Working Examples 3 and 4 using maple.

TABLE 3

| | WOOD TYPE | SAMPLE NO. | RATIO OF MASS OF SAPPANWOOD EXTRACT COMPONENT (%) | AIR-DRY DENSITY ($g/cm^3$) PRE-TREATMENT | POST-TREATMENT | RATE OF CHANGE (%) | ELASTIC MODULUS E' (Gpa) PRE-TREATMENT |
|---|---|---|---|---|---|---|---|
| WORKING | MAPLE | 1 | 5.07 | 0.66 | 0.65 | −0.82 | 10.01 |
| EXAMPLE | (L) | 2 | 5.23 | 0.63 | 0.63 | −0.22 | 10.14 |
| 3 | | AVERAGE | 5.15 | | | −0.52 | |
| WORKING | MAPLE | 1 | 6.30 | 0.64 | 0.64 | −0.12 | 1.77 |
| EXAMPLE | (R) | 2 | 6.26 | 0.64 | 0.64 | −0.56 | 1.74 |
| 4 | | AVERAGE | 6.28 | | | −0.34 | |
| WORKING | SPRUCE | 1 | 4.49 | 0.36 | 0.36 | 1.89 | 9.45 |
| EXAMPLE | (L) | 2 | 4.43 | 0.39 | 0.40 | 1.47 | 12.15 |
| 21 | | AVERAGE | 4.46 | | | 1.68 | |

TABLE 3-continued

| | | | | | | | |
|---|---|---|---|---|---|---|---|
| WORKING | SPRUCE | 1 | 7.21 | 0.41 | 0.42 | 3.21 | 0.88 |
| EXAMPLE | (R) | 2 | 7.35 | 0.41 | 0.41 | 1.80 | 0.86 |
| 22 | | AVERAGE | 7.28 | | | 2.50 | |
| WORKING | BIRCH | 1 | 2.97 | 0.66 | 0.65 | −0.99 | 15.48 |
| EXAMPLE | (L) | 2 | 3.72 | 0.64 | 0.63 | −1.62 | 13.91 |
| 23 | | AVERAGE | 3.35 | | | −1.31 | |
| WORKING | BIRCH | 1 | 4.90 | 0.67 | 0.67 | 0.16 | 1.35 |
| EXAMPLE | (R) | 2 | 5.03 | 0.67 | 0.67 | −0.70 | 1.36 |
| 24 | | AVERAGE | 4.97 | | | −0.27 | |

| | ELASTIC MODULUS E' (Gpa) | | TAN δ ($\times 10^{-3}$) | | |
|---|---|---|---|---|---|
| | POST-TREATMENT | RATE OF CHANGE (%) | PRE-TREATMENT | POST-TREATMENT | RATE OF CHANGE (%) |
| WORKING | 9.81 | −1.95 | 8.99 | 6.39 | −28.87 |
| EXAMPLE | 10.11 | −0.31 | 8.65 | 6.03 | −30.25 |
| 3 | | −1.13 | | | −29.56 |
| WORKING | 1.93 | 9.29 | 17.06 | 10.95 | −35.79 |
| EXAMPLE | 1.89 | 8.74 | 17.47 | 11.41 | −34.70 |
| 4 | | 9.01 | | | −35.24 |
| WORKING | 9.52 | 0.75 | 7.50 | 5.21 | −30.58 |
| EXAMPLE | 12.26 | 0.88 | 6.95 | 4.81 | −30.86 |
| 21 | | 0.81 | | | −30.72 |
| WORKING | 1.00 | 12.99 | 17.58 | 11.26 | −35.95 |
| EXAMPLE | 0.95 | 10.88 | 18.46 | 11.74 | −36.43 |
| 22 | | 11.93 | | | −36.19 |
| WORKING | 15.02 | −2.97 | 7.46 | 5.35 | −28.21 |
| EXAMPLE | 13.17 | −5.30 | 8.11 | 5.32 | −34.40 |
| 23 | | −4.14 | | | −31.30 |
| WORKING | 1.55 | 14.32 | 22.84 | 16.80 | −26.47 |
| EXAMPLE | 1.50 | 9.95 | 22.53 | 14.56 | −35.37 |
| 24 | | 12.13 | | | −30.92 |

TABLE 4

| | WOOD TYPE | SAMPLE NO. | RATIO OF MASS OF SAPPANWOOD EXTRACT COMPONENT (%) | AIR-DRY DENSITY ($g/cm^3$) PRE-TREATMENT | AIR-DRY DENSITY ($g/cm^3$) POST-TREATMENT | AIR-DRY DENSITY ($g/cm^3$) RATE OF CHANGE (%) | ELASTIC MODULUS E' (Gpa) PRE-TREATMENT |
|---|---|---|---|---|---|---|---|
| WORKING | BEECH | 1 | 4.04 | 0.70 | 0.71 | 1.31 | 16.10 |
| EXAMPLE | (L) | 2 | 4.20 | 0.69 | 0.69 | −0.20 | 15.28 |
| 25 | | AVERAGE | 4.12 | | | 0.56 | |
| WORKING | BEECH | 1 | 5.91 | 0.71 | 0.71 | 0.13 | 1.87 |
| EXAMPLE | (R) | 2 | 6.01 | 0.70 | 0.71 | 0.81 | 1.81 |
| 26 | | AVERAGE | 5.96 | | | 0.47 | |
| WORKING | MAHOGANY | 1 | 1.68 | 0.57 | 0.56 | −0.34 | 10.66 |
| EXAMPLE | (L) | 2 | 1.97 | 0.57 | 0.57 | 0.31 | 5.39 |
| 27 | | AVERAGE | 1.83 | | | −0.01 | |
| WORKING | MAHOGANY | 1 | 2.75 | 0.54 | 0.53 | −0.95 | 1.42 |
| EXAMPLE | (R) | 2 | 2.52 | 0.54 | 0.54 | −0.53 | 1.44 |
| 28 | | AVERAGE | 2.63 | | | −0.74 | |
| WORKING | WALNUT | 1 | 1.28 | 0.67 | 0.65 | −3.81 | 12.21 |
| EXAMPLE | (L) | 2 | 0.80 | 0.63 | 0.62 | −1.59 | 10.43 |
| 29 | | AVERAGE | 1.04 | | | −2.70 | |
| WORKING | WALNUT | 1 | 1.89 | 0.60 | 0.59 | −2.80 | 1.79 |
| EXAMPLE | (R) | 2 | 2.11 | 0.60 | 0.58 | −2.69 | 1.71 |
| 30 | | AVERAGE | 2.00 | | | −2.75 | |

| | ELASTIC MODULUS E' (Gpa) | | TAN δ ($\times 10^{-3}$) | | |
|---|---|---|---|---|---|
| | POST-TREATMENT | RATE OF CHANGE (%) | PRE-TREATMENT | POST-TREATMENT | RATE OF CHANGE (%) |
| WORKING | 15.85 | −1.52 | 8.39 | 5.45 | −34.97 |
| EXAMPLE | 14.42 | −5.61 | 8.47 | 5.34 | −36.92 |
| 25 | | −3.56 | | | −35.95 |

TABLE 4-continued

| | | | | | |
|---|---|---|---|---|---|
| WORKING | 1.94 | 3.62 | 20.47 | 13.03 | −36.35 |
| EXAMPLE | 1.95 | 8.10 | 20.35 | 13.11 | −35.57 |
| 26 | | 5.86 | | | −35.96 |
| WORKING | 10.39 | −2.58 | 6.90 | 6.08 | −11.87 |
| EXAMPLE | 5.26 | −2.40 | 9.89 | 8.67 | −12.34 |
| 27 | | −2.49 | | | −12.11 |
| WORKING | 1.41 | −0.63 | 18.12 | 14.54 | −19.78 |
| EXAMPLE | 1.43 | −0.66 | 18.38 | 15.15 | −17.57 |
| 28 | | −0.64 | | | −18.67 |
| WORKING | 11.41 | −6.54 | 8.71 | 6.03 | −30.74 |
| EXAMPLE | 10.03 | −3.88 | 8.09 | 5.81 | −28.19 |
| 29 | | −5.21 | | | −29.46 |
| WORKING | 1.70 | −5.14 | 15.83 | 11.24 | −29.02 |
| EXAMPLE | 1.62 | −4.84 | 15.92 | 11.39 | −28.47 |
| 30 | | −4.99 | | | −28.75 |

As shown in Tables 3 and 4, it was confirmed that a reduction in the internal loss of each wood material used in Working Examples 3 and 4 and Working Examples 21 to 30 was achieved by immersion of the wood material in the sappanwood extract liquid to impregnate the sappanwood extract component therein.

In order to solve the above-described problems (see the section of "Description of Related Art"), the present inventor conducted extensive studies, focusing on a modifying component that can be easily manufactured without purification as a modifying component to be impregnated into a wood material in order to reduce the internal loss of the wood material.

As a result, the present inventor has found that it is only necessary to use a sappanwood extract component as a modifying component, thereby arriving at the present embodiment.

That is, the present embodiment relates to the following matters.

(1) A modified wood including: a wood material; and a sappanwood extract component impregnated in the wood material.

(2) The modified wood according to (1), wherein mass of the sappanwood extract component is 0.5 to 10% of mass of the wood material in an absolutely dry condition.

(3) The modified wood according to (1) or (2), wherein an internal loss of the wood material in a fiber direction is $4\times10^{-3}$ or more.

(4) The modified wood according to any one of (1) to (3), wherein the wood material includes any one of maple, spruce, mahogany, beach, birch, and walnut.

(5) A method for manufacturing a modified wood, including: an impregnation step of impregnating a wood material with a sappanwood extract component.

(6) The method according to (5), wherein the impregnation step includes a step of immersing the wood material in a sappanwood solution containing 0.1 to 5.0% by mass of the sappanwood extract component.

(7) The method according to (5) or (6), further including: an extraction step of extracting the sappanwood extract component from sappanwood using water, the extraction step being performed after the impregnation step is performed, wherein the extraction step includes extracting the sappanwood extract component until mass of solid content extracted from the sappanwood is 8 to 12% of mass of the sappanwood.

(8) A musical instrument comprising the modified wood according to any one of (1) to (4).

The modified wood of the present embodiment includes a wood material and a sappanwood extract component impregnated in the wood material. The sappanwood extract component can be obtained simply by extraction from sappanwood using water, and can be easily manufactured without purification.

The sappanwood extract component is a modifying component that reduces the internal loss of the wood material by being impregnated in the wood material. Therefore, the modified wood of the present embodiment has low internal loss.

The method for manufacturing modified wood of the present embodiment includes an impregnation step of impregnating a wood material with a sappanwood extract component. According to this method, the internal loss of a wood material can be reduced using a modifying component that can be manufactured easily without purification.

The musical instrument of the present embodiment uses the modified wood of the present embodiment. Since the modified wood of the present embodiment has low internal loss, the musical instrument of the present embodiment has good sound quality.

While the embodiments and the examples of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A modified wood for use in a musical instrument, the modified wood comprising:

a wood material; and a sappanwood extract component impregnated in the wood material, wherein an internal loss of the wood material in a fiber direction is $4\times10^{-3}$ or more and $12\times10^{-3}$ or less, an internal loss of the wood material in a radial direction is $12\times10^{-3}$ or more and $25\times10^{-3}$ or less, an elastic modulus of the modified wood in a fiber direction is 7 GPa or more and 20 GPa or less, an elastic modulus of the modified wood in a radial direction is 0.5 GPa or more and 2.5 GPa or less, the sappanwood extract component is a water-extracted and unpurified component, and the sappanwood extract component has a solid content mass of 8 to 12% of sappanwood.

2. The modified wood according to claim 1, wherein a mass of the sappanwood extract component is 0.5 to 10% of a mass of the wood material in an absolutely dry condition.

3. The modified wood according to claim 1, wherein the wood material comprises any one of maple, spruce, mahogany, beach, birch, and walnut.

4. A musical instrument comprising the modified wood according to claim 1.

5. The modified wood according to claim 1, wherein air-dry density of the modified wood is 0.2 $g/cm^{-3}$ or more and 1.2 $g/cm^{-3}$ or less.

6. The modified wood according to claim 1, wherein a rate of change of the internal loss from before the treatment [{(post-treatment-pre-treatment)/pre-treatment}×100(%)] is −45.86% or more and −12.11% or less.

7. A method for manufacturing a modified wood for use in a musical instrument, the method comprising:

an impregnation step of impregnating a wood material with a sappanwood extract component, wherein an internal loss of the wood material in a fiber direction is $4\times10^{-3}$ or more and $12\times10^{-3}$ or less, an internal loss of the wood material in a radial direction is $12\times10^{-3}$ or more and $25\times10^{-3}$ or less, an elastic modulus of the modified wood in a fiber direction is 7 GPa or more and 20 GPa or less, an elastic modulus of the modified wood in a radial direction is 0.5 GPa or more and 2.5 GPa or less, the sappanwood extract component is a water-extracted and unpurified component, and the sappanwood extract component has a solid content mass of 8 to 12% of sappanwood.

8. The method according to claim 7, wherein the impregnation step comprises a step of immersing the wood material in a sappanwood solution containing 0.1 to 5.0% by mass of the sappanwood extract component.

9. The method according to claim 7, further comprising:

an extraction step of extracting the sappanwood extract component from sappanwood using water, the extraction step being performed prior to the impregnation step being performed, wherein the extraction step comprises extracting the sappanwood extract component until a mass of solid content extracted from the sappanwood is 8 to 12% of a mass of the sappanwood.

10. The method according to claim 7, wherein the extraction step is using water and without purification.

11. The method according to claim 7, wherein the impregnation step further comprises at least one of following:

transmitting ultrasonic waves to the sappanwood solution in which the wood material is immersed, making a hole in the wood material and then immersing in the sappanwood solution, subjecting the wood material to reduced pressure while immersed in the sappanwood solution, subjecting the wood material to increased pressure while being immersed in the sappanwood solution, and heating the sappanwood solution in which the wood material is immersed.

12. A modified wood for use in a musical instrument, the modified wood having an improved internal loss value, the modified wood comprising:

a wood material having a first internal loss value; and a sappanwood extract component that is impregnated into the wood material, such that after the wood material is impregnated the wood material attains a second internal loss value that is lower than the first internal loss value, wherein an internal loss of the wood material in a fiber direction is $4\times10^{-3}$ or more and $12\times10^{-3}$ or less, an internal loss of the wood material in a radial direction is $12\times10^{-3}$ or more and $25\times10^{-3}$ or less, an elastic modulus of the modified wood in a fiber direction is 7 GPa or more and 20 GPa or less, an elastic modulus of the modified wood in a radial direction is 0.5 GPa or more and 2.5 GPa or less, the sappanwood extract component is a water-extracted and unpurified component, and the sappanwood extract component has a solid content mass of 8 to 12% of sappanwood.

13. The modified wood according to claim 12, wherein a mass of the sappanwood extract component is 0.5 to 10% of a mass of the wood material in an absolutely dry condition.

14. The modified wood according to claim 12, wherein the wood material comprises any one of maple, spruce, mahogany, beach, birch, and walnut.

15. The modified wood according to claim 12, wherein a rate of change of the internal loss from before the treatment [{(post-treatment-pre-treatment)/pre-treatment}×100(%)] is −45.86% or more and −12.11% or less.

* * * * *